March 1, 1927.
A. G. HARTUNG
1,619,471
TENSION FASTENING FOR ANTISLIP CHAINS
Filed Sept. 30, 1926
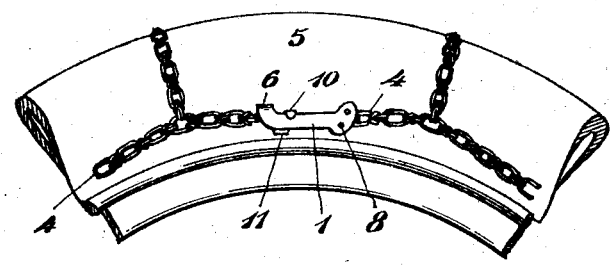
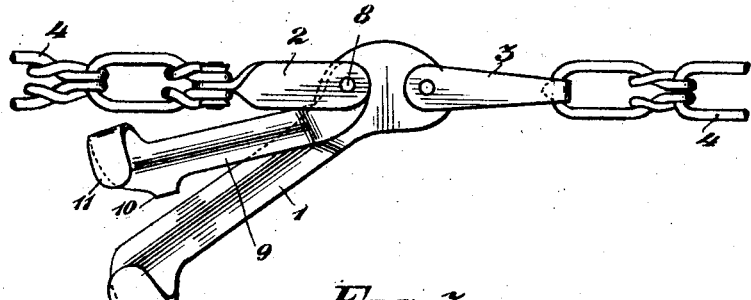
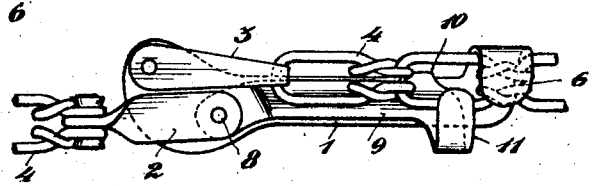
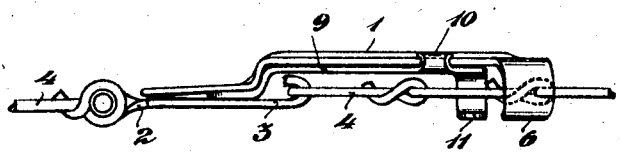
Adalberto Gualterio Hartung
INVENTOR
his ATTY.

Patented Mar. 1, 1927.

1,619,471

UNITED STATES PATENT OFFICE.

ADALBERTO GUALTERIO HARTUNG, OF BUENOS AIRES, ARGENTINA.

TENSION FASTENING FOR ANTISLIP CHAINS.

Application filed September 30, 1926. Serial No. 138,609.

This description of invention relates to certain improvements which I have introduced in tension fastenings for the ordinary chains which are applied to the wheels of automobiles and other vehicles, with the object of facilitating their progress in sandy places or on muddy ground.

As will be shown further on, I have devised a means for impeding the opening of the fastening even in cases where through the deflation of the tire or for some other cause the lateral chains have lost their tension, which is precisely what happens with the fastening in the majority of the existing methods.

This I have effected by the use of a lever disposed in such a manner that the chain or cable is enclosed as in a collar, this being formed by the flanging of the principal lever and of the supplementary lever.

In order that this description may be better understood, I attach hereto detailed sketches in which:

Fig. 1 shows a section of a pneumatic tire on which is applied an anti-slip chain secured by means of a tension fastening in accordance with my invention.

Fig. 2 shows the tension fastening open.

Fig. 3 shows the same closed.

Fig. 4 is a profile projection of Fig. 3.

As may be seen in the sketches, the principal lever 1, by inverting the positions of the prolongations 2 and 3, brings closer together the extremes of the chain 4, and at the same time tightens the grip of the chain round the cover 5. The retention in position of the fastening is obtained, on hooking the turned over flange 6 of the lever 1 in the chain by means of the tension of the chain itself. To guard against the fastening coming unhooked if for any reason the tension of the chain is relaxed, a small lever, articulated at point 8, has been provided, in which the small wing-hook 10 hooks on to the edge of the principal lever 1, while the large hook 11 prevents the chain from escaping.

By this means the chain is imprisoned in a collar formed by the flanged hooks 6 and 11 at the respective extremities of the levers 7 and 9.

To open the fastening, the lever 9 is moved slightly so as to disengage the small hook 10, which allows this lever to be lowered quite easily. The lever 7 is then moved until the hook 6 is disengaged from the chain.

The nature of my invention having been explained, with the manner of putting it in practice, what I claim as my exclusive property or invention is:

In a chain fastening device, the combination of a lever having spaced pivotal connections at one end with opposite ends of a chain and a hook at the other end adapted to engage over the chain when the pivotal connections have been reversed by operation of the lever to tighten the chain, a second lever pivoted at one end to one of the pivotal connections of the chain and first lever and having its free end provided with oppositely projecting hooks, one thereof being adapted to engage over the first lever adjacent its hook when the second lever is closed and the other hook of the second lever being engaged under the chain at a point inside the engaged hook of the first lever and chain.

ADALBERTO GUALTERIO HARTUNG.